US008719389B2

(12) United States Patent
Domsch et al.

(10) Patent No.: US 8,719,389 B2
(45) Date of Patent: May 6, 2014

(54) SYSTEM AND METHOD FOR AN ACCESS CONTROLLER ASSISTED BOOT

(75) Inventors: Matthew L. Domsch, Austin, TX (US); Javier L. Jimenez, Austin, TX (US)

(73) Assignee: Dell Products L.P., Round Rock, TX (US)

(*) Notice: Subject to any disclaimer, the term of this patent is extended or adjusted under 35 U.S.C. 154(b) by 381 days.

(21) Appl. No.: 12/915,407

(22) Filed: Oct. 29, 2010

(65) Prior Publication Data

US 2012/0110312 A1    May 3, 2012

(51) Int. Cl.
*G06F 15/177* (2006.01)
(52) U.S. Cl.
USPC .......................................................... 709/222
(58) Field of Classification Search
USPC ................ 709/222, 201, 203, 212, 217–220, 709/227–229; 713/1, 2, 100
See application file for complete search history.

(56) References Cited

U.S. PATENT DOCUMENTS

| 6,925,533 | B2* | 8/2005 | Lewis ............................. 711/118 |
| 7,747,847 | B2* | 6/2010 | El Zur et al. ....................... 713/2 |
| 2003/0005096 | A1* | 1/2003 | Paul et al. ...................... 709/222 |
| 2008/0209196 | A1* | 8/2008 | Hernandez et al. ................ 713/2 |

OTHER PUBLICATIONS

The Open Firmware Working Group, TFTP Booting Extension Version 1.0, Aug. 1998, the Open Firmware Working Group, www.openfirmware.org/1275/practice/.*
Etherboot/gPXE Wiki; "Boot scripts"; http.//www.etherboot.org/wiki/scripting; pp. 2, Oct. 18, 2010.
Microsoft; "Enabling Diskless Windows Boot With iSCI"; download.microsoft.com/download/5/b/9/5b97017b.../sto026_wh06.ppt; pp. 12, Oct. 18, 2010.
Microsoft; "iSCI Boot Firmware Table (iRFT) as Defined in ACPI 3.0b Specification"; http://microsoft.com/whdc/system/platform/firmware/default.mspx ; pp. 11, Aug. 21, 2009.

* cited by examiner

*Primary Examiner* — Ruolei Zong
(74) *Attorney, Agent, or Firm* — Baker Botts L.L.P.

(57) ABSTRACT

Systems and methods for reducing problems and disadvantages associated with network boots are disclosed. In accordance with an embodiment of the present disclosure, an information handling system comprises a processor, a memory communicatively coupled to the processor, and an access controller communicatively coupled to the processor. The access controller has stored thereon a general pre-boot file and configured to receive boot configuration information from a management server. The access controller further configured to generate a boot script according to the boot configuration information and generate a specific pre-boot file based on the general pre-boot file and the boot script. The access controller is further configured to configure the information handling system to boot to a target based on the specific pre-boot file.

18 Claims, 3 Drawing Sheets

SYSTEM AND METHOD FOR AN ACCESS CONTROLLER ASSISTED BOOT

TECHNICAL FIELD

The present disclosure relates in general to information handling systems, and more particularly to booting information handling systems from remote devices with an access controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be configured to boot from other information handling systems over a network instead of from a local storage utility of the information handling system. This "network booting" may allow for centralized management of storage and may also allow for "cluster" computing in which individual information handling systems may not include local storage media configured to retrieve and store data or having operating systems installed thereon. However, securely configuring information handling systems to perform a network boot may be difficult due to the limited processing capabilities of these systems before they boot. Additionally, ensuring that the network boots are secure may be difficult.

SUMMARY

In accordance with the teachings of the present disclosure, the disadvantages and problems associated with network boots, have been reduced or eliminated. In accordance with an embodiment of the present disclosure, an information handling system comprises a processor, a memory communicatively coupled to the processor, and an access controller communicatively coupled to the processor. The access controller has stored thereon a general pre-boot file and configured to receive boot configuration information from a management server. The access controller further configured to generate a boot script according to the boot configuration information and generate a specific pre-boot file based on the general pre-boot file and the boot script. The access controller is further configured to configure the information handling system to boot to a target based on the specific pre-boot file.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
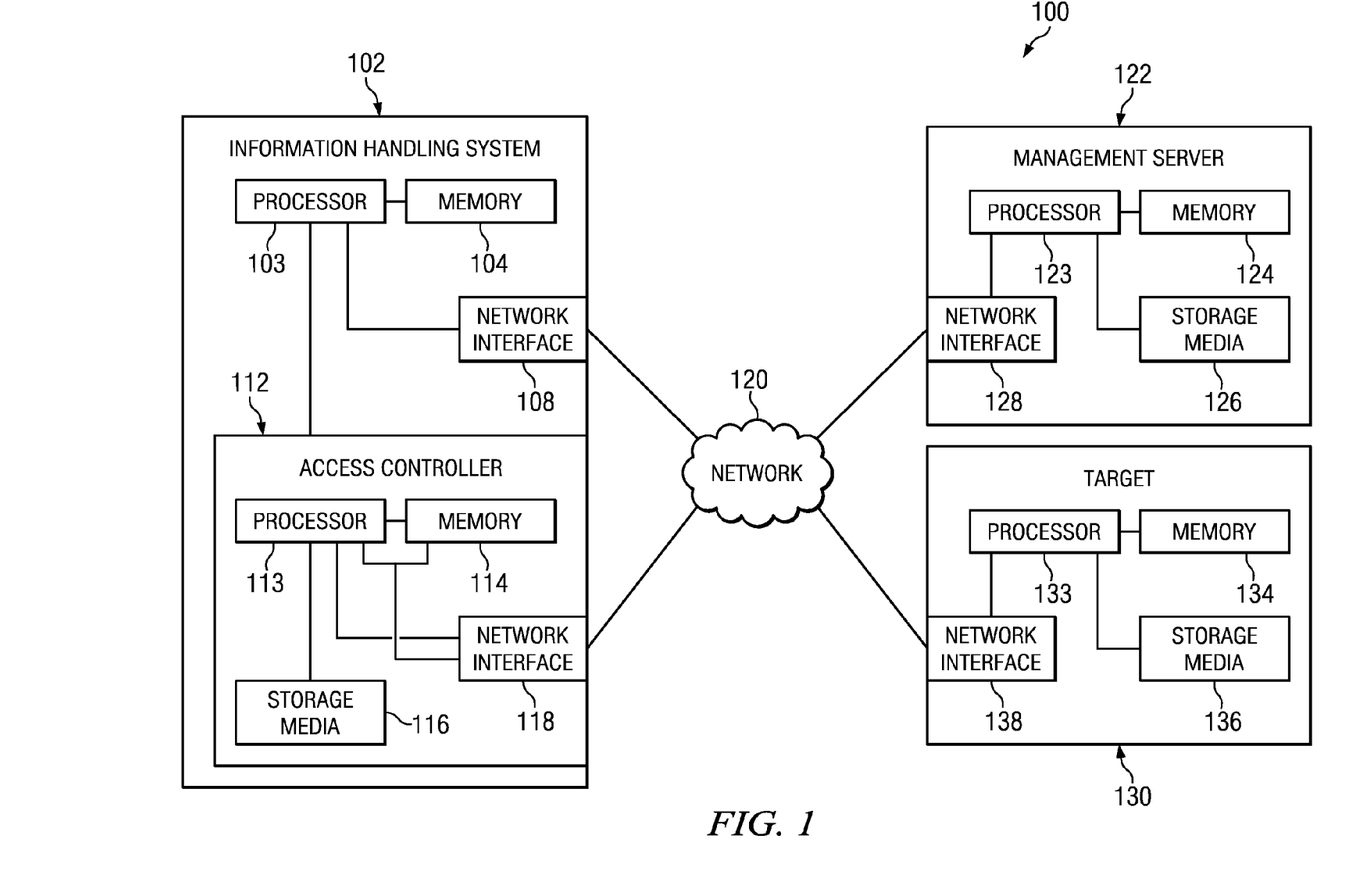
FIG. 1 illustrates a block diagram of an example system for secure booting of an information handling system using a network, in accordance with certain embodiments of the present disclosure.
Figure 2:
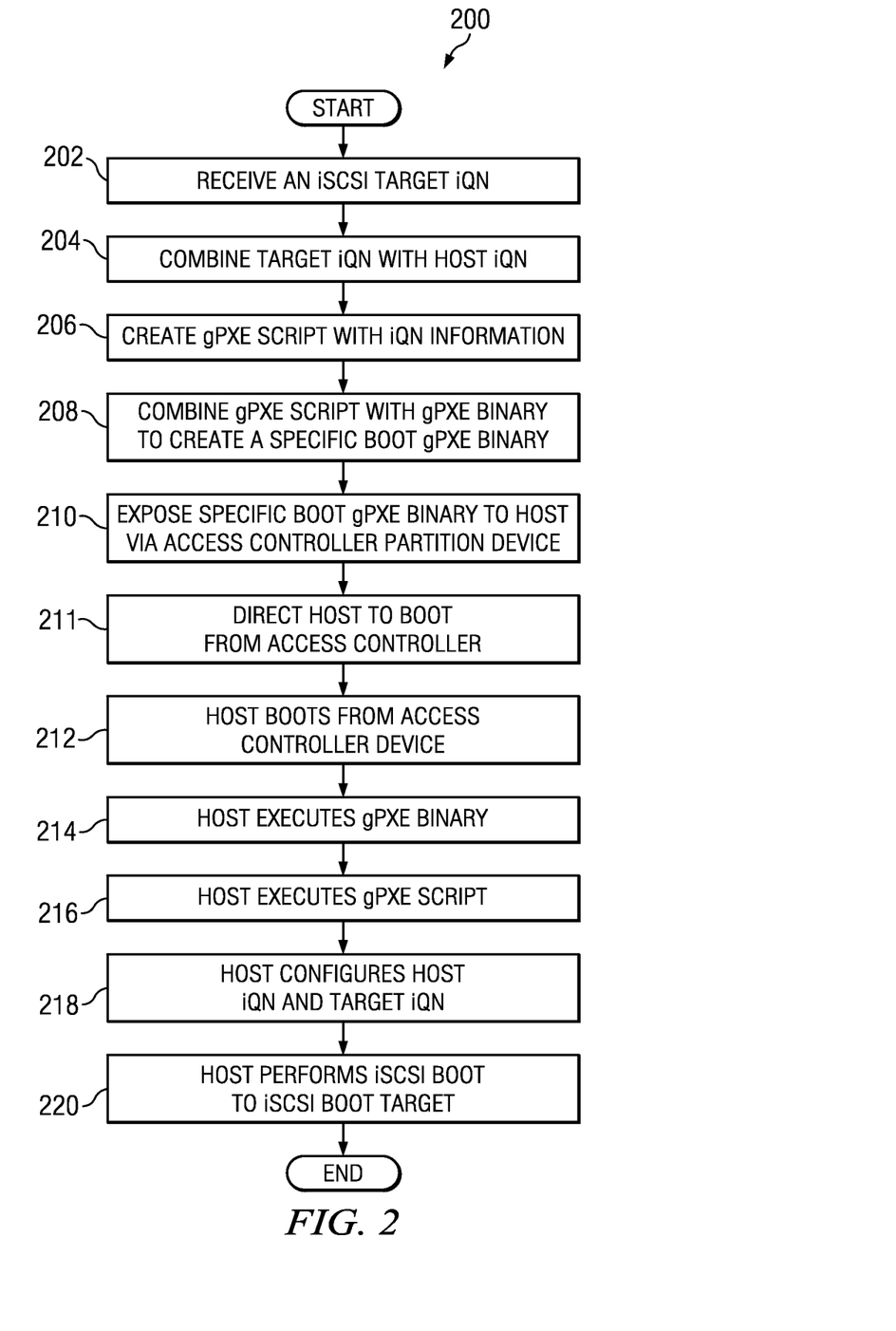
FIG. 2 illustrates a flow chart of an example method for securely configuring an information handling system to perform a network boot from a remote target, in accordance with certain embodiments of the present disclosure.
Figure 3:
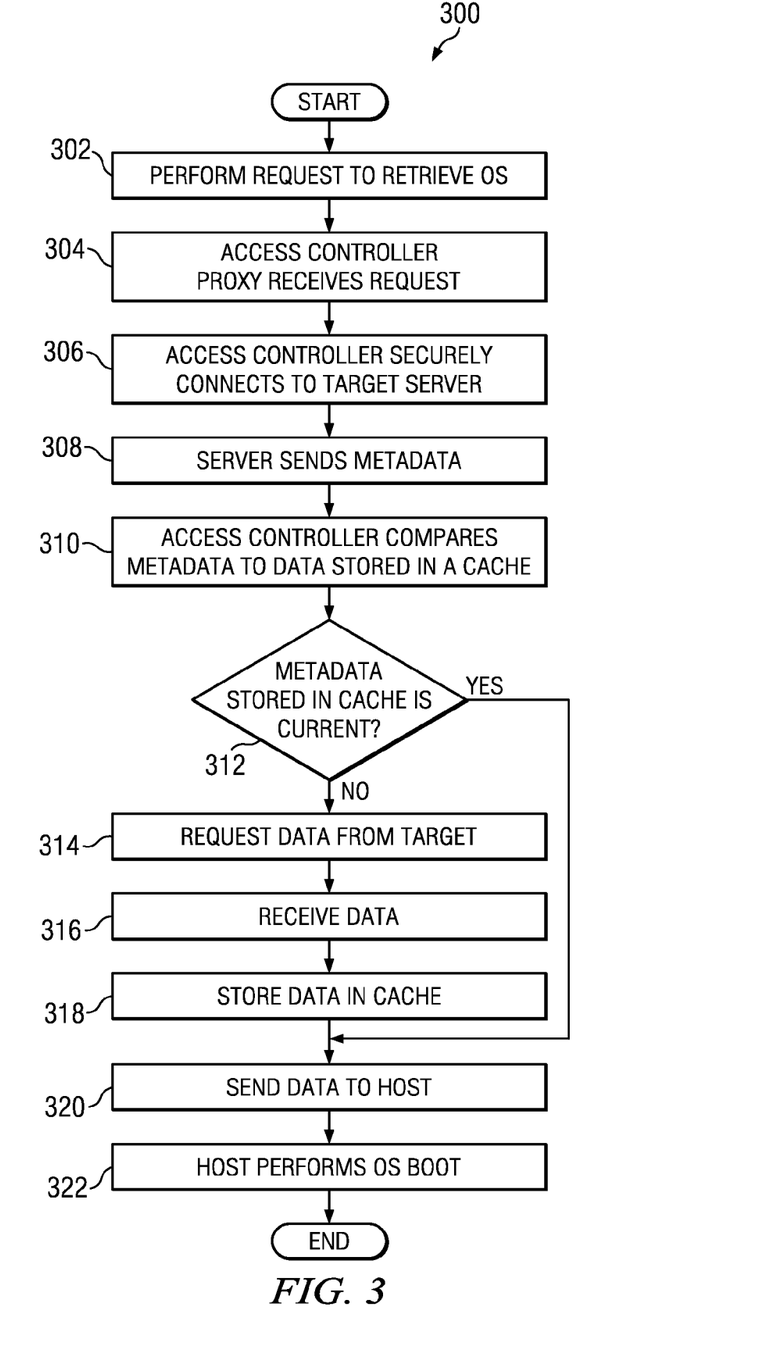
FIG. 3 illustrates a flow chart of an example method for securely performing a network boot of an information handling system from a remote target.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 for secure booting of an information handling system 102, in accordance with certain embodiments of the present disclosure. As depicted in FIG. 1, system 100 may include an information handling system 102, a network 120, a management server 122, and a target 130.

Information handling system 102 may generally be operable to receive data from and/or communicate data to one or more other information handling systems via network 120. In certain embodiments, information handling system 102 may be a server. In another embodiment, information handling system 102 may be a personal computer (e.g., a desktop computer or a portable computer). In the same or other embodiments, information handling system 102 may be configured to perform a network boot, using any suitable network boot protocol, as described in further detail with respect to FIGS. 2 and 3. A network boot protocol may allow information handling system 102 to boot from a remote target 130 via network 120. In some embodiments, information handling system 102 may include an Internet Small Computer System (iSCSI) initiator configured to perform a network boot from an iSCSI target device using an iSCSI protocol. A network boot initiated with an iSCSI protocol may be referred to as an iSCSI boot. In other embodiments, information handling system 102 may include a web client configured to perform a network boot from a web server using a security protocol, such as a secure Hypertext Transfer Protocol (HTTPS).

As depicted in FIG. 1, information handling system 102 may include a processor 103, a memory 104 communicatively coupled to processor 103, a network interface 108 communicatively coupled to processor 103, and an access controller 112 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Network interface 108 may include any suitable system, apparatus, or device operable to serve as an interface between information handling system 102 and network 120. Network interface 108 may enable information handling system 102 to communicate over network 120 using any suitable transmission protocol and/or standard, including without limitation all transmission protocols and/or standards enumerated below with respect to the discussion of network 120. In certain embodiments, network interface 108 may be configured with hardware, software, and/or firmware to allow its associated information handling system 102 to remotely boot from a computer-readable medium remote from information handling system 102 (e.g., a computer-readable medium coupled to network interface 108 via network 120).

Access controller 112 may be any system, device, or apparatus configured to monitor and/or manage information handling system 102. In certain embodiments, access controller 112 may include or may be an integral part of a Dell Remote Access Controller (DRAC) or an Integrated Dell Remote Access Controller (iDRAC). Access controller may be configured to permit an administrator or other person to remotely monitor and/or remotely manage information handling system 102 (e.g., via a management server 122 remotely connected to information handling system 102 via network 120) regardless of whether information handling system 102 is powered on and/or has an operating system installed thereon.

In certain embodiments, access controller 112 may be configured to internally and securely communicate information to information handling system 102 without utilizing network 120. Thus, for example, if network 120 is unavailable or experiencing other performance problems, access controller 112 may still maintain communication with information handling system 102 and thus perform management operations of information handling system 102. Additionally, the internal and secure connection between access controller 112 and information handling system 102 may protect the information and data being transferred between information handling system 102 and access controller 112 from being accessed by unauthorized parties.

In certain embodiments, access controller 112 may be configured to securely configure information handling system 102 to perform a network boot from a target 130, as described in more detail with respect to FIG. 2. In the same or other embodiments, access controller 112 may be configured to manage a secure network boot of information handling system 102 from a target 130, as described in more detail with respect to FIG. 3.

As depicted in FIG. 1, access controller 112 may include a processor 113, a memory 114 communicatively coupled to processor 113, a storage media 116 communicatively coupled to processor 103 and a network interface 118 communicatively coupled to processor 113.

Processor 113 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102.

Memory 114 may be communicatively coupled to processor 113 and may include any system, device, or apparatus configured to retain program instructions and/or data for a period of time (e.g., computer-readable media). Memory 114 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In certain embodiments, memory 114 may store firmware that includes executable instructions to govern operation of access controller 112.

Storage media 116 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

Network interface 118 may include any suitable system, apparatus, or device operable to serve as an interface between access controller 112 and network 120. Network interface 118 may enable access controller 102 to communicate over network 120 using any suitable transmission protocol and/or standard, including without limitation all transmission protocols and/or standards enumerated below with respect to the discussion of network 120.

Network 120 may be a network and/or fabric configured to communicatively couple information handling system 102, access controller 112, management server 122, target 130, other information handling systems, and/or other networked components to each other. Network 120 may include a communication infrastructure, which provides physical connections, and a management layer, which organizes the physical connections, information handling system 102, access controller 112, management server 122, and target 130. In the same or alternative embodiments, network 120 may allow block I/O services and/or file access services to network-attached computer-readable media.

Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Management server 122 may comprise an information handling system and may generally be operable to receive data from and/or communicate data to one or more other information handling systems via network 120. In certain embodiments, management server 122 may be configured to communicate data and/or instructions to information handling system 102. In the same or other embodiments, management server 122 may be configured to communicate network booting instructions to information handling system 102, as described in greater detail with respect to FIG. 2.

As depicted in FIG. 1, management server 122 may include a processor 123, a memory 124 communicatively coupled to processor 123, storage media 126 communicatively coupled to processor 123, and a network interface 128 communicatively coupled to processor 123.

Processor 123 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124, storage media 126 and/or another component of management server 122.

Memory 124 may be communicatively coupled to processor 123 and may include any system, device, or apparatus configured to retain program instructions and/or data for a period of time (e.g., computer-readable media). Memory 124 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to management server 122 is turned off.

Storage media 126 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

Network interface 128 may include any suitable system, apparatus, or device operable to serve as an interface between management server 122 and network 120. Network interface 128 may enable management server 122 to communicate over network 120 using any suitable transmission protocol and/or standard, including without limitation all transmission protocols and/or standards enumerated above with respect to the discussion of network 120. In certain embodiments, network interface 128 may be configured with hardware, software, and/or firmware to allow its associated management server 122 to remotely boot from a computer-readable medium remote from information handling system 102 (e.g., a computer-readable medium coupled to network interface 108 via network 120). In the same or other embodiments, network interface 128 may be configured with hardware, software, and/or firmware to allow its associated management server 122 to remotely boot from a computer-readable medium remote from access controller 112 (e.g., a computer-readable medium coupled to network interface 118 via network 120).

Target 130 may comprise an information handling system and may comprise any system, apparatus or device configured to communicate or transfer data or information with information handling system 102 via network 120. In some embodiments target 130 may comprise a device having an operating system or other programs stored thereon and may be configured to allow information handling system 102 to perform a network boot of the operating system from target 130. In some embodiments, target 130 may be configured as an iSCSI target device such that an information handling system 102 including an iSCSI initiator may perform an iSCSI boot with respect to target 130. In other embodiments, target 130 may include a web server such that an information handling system 102 including a web client may perform a secure network boot (e.g., using HTTPS) from target 130.

As depicted in FIG. 1, target 130 may include a processor 133, a memory 134 communicatively coupled to processor 133, storage media 136 communicatively coupled to processor 133, and a network interface 138 communicatively coupled to processor 133.

Processor 133 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 133 may interpret and/or execute program instructions and/or process data stored in memory 134, storage media 136 and/or another component of target 130.

Memory 134 may be communicatively coupled to processor 133 and may include any system, device, or apparatus configured to retain program instructions and/or data for a period of time (e.g., computer-readable media). Memory 134 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to target 130 is turned off.

Storage media 136 may include computer-readable media (e.g., hard disk drive, floppy disk drive, CD-ROM, and/or other type of rotating storage media, flash memory, EEPROM, and/or other type of solid state storage media) and may be generally operable to store data and/or programs (e.g., one or more operating systems and/or one or more application programs).

Network interface 138 may include any suitable system, apparatus, or device operable to serve as an interface between target 130 and network 120. Network interface 138 may enable provisioning server to communicate over network 120 using any suitable transmission protocol and/or standard, including without limitation all transmission protocols and/or standards enumerated above with respect to the discussion of network 120. In certain embodiments, network interface 138 may be configured with hardware, software, and/or firmware to allow its associated target 130 to remotely boot from a computer-readable medium remote from information handling system 102 (e.g., a computer-readable medium coupled to network interface 108 via network 120).

FIG. 2 illustrates a flow chart of an example method 200 for securely configuring an information handling system (e.g., information handling system 102) to perform a network boot from a remote target, in accordance with certain embodiments of the present disclosure. As mentioned above, in some embodiments, information handling system 102 may be configured as an iSCSI host that includes an iSCSI initiator configured to perform an iSCSI boot. Additionally, in the same or other embodiments, target 130 may be configured as an iSCSI target device. Further, as mentioned above, in other embodiments, information handling system 102 may comprise a host that includes a web client configured to perform a secure network boot using a secure network boot protocol (e.g., HTTPS) from a target 130 including a web server. Accordingly, target 130 may have an operating system (OS) stored on a storage media 136 or another suitable storage device for information handlings system 102 to boot from via network 120. Although two network boot protocols are mentioned, information handling system 102 may be configured to perform any suitable type of network boot from target 130 according to method 200.

According to one embodiment, method 200 may begin at step 202. As noted above, teachings of the present disclosure may be implemented in a variety of configurations of system 100. As such, the preferred initialization point for method 200 and the order of the steps 202-220 comprising method 200 may depend on the implementation chosen.

At step 202, access controller 112 may receive an instruction from management server 122 to boot information handling system 102. In an iSCSI application, the boot instruction may include a host iSCSI qualified name (iQN) associated with information handling system 102 and a target iQN. The target iQN may be associated with target 130, thus indicating that information handling system 102 perform an iSCSI boot from target 130. In other applications, the boot instruction may include any suitable host and target identification information, such as web client and web server identification information. The host and target identification information (e.g., the target iQN and the host iQN) and boot instruction may be used by any suitable network boot loader stored in memory 114 or storage media 116 of access controller 112. In some embodiments, the network boot loader may be a network pre-boot execution environment (gPXE) boot loader stored on information handling system 102. The network boot loader (e.g., gPXE) may allow information handling system 102 to utilize network protocols to perform a network boot from target 130 via network 120 (e.g., Hypertext Transfer Protocol (HTTP), Dynamic Host Configuration Protocol (DHCP), iSCSI, etc.), whereas a traditional boot loader (e.g., PXE) may utilize a less versatile protocol to transfer information, such as a Trivial File Transfer Protocol (TFTP).

At step 204, access controller 112 may combine the target and host identification information (e.g., target iQN and the host iQN) into identification information (e.g., iQN information) to be included in a network booting script (e.g., gPXE script). At step 206, access controller 112 may create a network booting script containing configuration directives including the target and host identification information. The network booting script may be configured to direct information handling system 102 to perform a network boot from target 130 based on the target and host identification information (e.g., perform an iSCSI boot from an iSCSI target device based on the target iQN associated with the iSCSI target device).

At step 208, access controller 112 may combine the network booting script (e.g., gPXE script) with a general network boot loader binary file (e.g., gPXE binary file) to generate a specific boot binary file (e.g., specific boot gPXE binary file) that includes the network boot configuration information, including the host and target identifiers (e.g., iSCSI configuration information, such as the host iQN and the target iQN). Using the configuration information, the specific boot binary file may be configured to direct information handling system 102 to boot from target 130. Accordingly, access controller 112 may generate a boot file configured to direct information handling system 102 such that information handling system 102 performs a network boot from target 130.

At step 210, access controller 112 may expose the specific boot binary file to information handling system 102, such that information handling system 102 may initiate a network boot (e.g., an iSCSI boot) by booting from access controller 112 based on the specific boot binary file. Thus, access controller 112 may configure information handling system 102 to boot from the specific boot binary file, which may direct information handling system 102 to boot to target 130 associated with the target identification information. In the present example, access controller 112 may store the specific boot binary file in storage media 116, and allow information handling system 102 access to the portion of storage media 116 containing the specific boot binary file. The portion of storage media 116 exposed to information handling system 102 may be referred to as an access controller partition. In some embodiments, an iSCSI initiator of information handling system 102 may be exposed to the access controller partition. In other embodiments, a web client of information handling system 102 may be exposed to the access controller partition.

As noted earlier, communications between access controller 112 and information handling system 102 may be inherently secure. Accordingly, the information transferred from access controller 112 to information handling system 102 (e.g., the specific boot binary file stored on the access controller partition), may be securely transferred. The present embodiment may be an improvement over some traditional network boot implementations, where the network boot configuration information (e.g., a gPXE binary file and script) may be insecurely conveyed to a host (e.g., from a management server) via a network—instead of being securely conveyed by an access controller 112—such that the network boot configuration information may be snooped, due to the insecure connection, or lost if the network services are reduced or unavailable.

Returning to method 200, at step 211, access controller 112 may direct information handling system 102 to boot from the access controller partition. At step 212, information handling system 102 may securely initiate a network boot from the access controller partition. At step 214, information handling system 102 may execute the specific boot binary file stored on the access controller partition.

At step 216, information handling system 102 may execute the network booting script of the network boot binary file to configure information handling system 102 with the host identification information (e.g., the host iQN to be used for an iSCSI session). At step 218, information handling system 102 may configure the host and target identification information in the network boot script file in preparation for booting to the target 130 associated with the target identification information. At step 220, information handling system 102 may securely perform a network boot between information handling system 102 and target 130 based on the network booting instructions. Access controller 112 may be configured to establish the secure connection between information handling system 102 and target 130 as described in further detail with respect to FIG. 3. Following step 220, method 200 may end.

Accordingly, access controller 112 may configure information handling system 102 to perform a network boot with respect to a target 130 in a single boot cycle, thus reducing the amount of time that information handling system 102 may be unavailable to perform its various functions. The present embodiment may be an improvement over some traditional implementations that may require a host to initiate a first boot to configure the host to run a network boot protocol and a second boot for the host to execute the network boot protocol.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order. Method 200 may be implemented using system 100 or any other system operable to implement method 200. In certain embodiments, method 200 may be implemented partially or fully in software and/or firmware embodied in computer-readable media. For example, an initiator included in information handling system 102 may be configured to perform the operations of information handling system 102 with respect to an iSCSI boot, and a web client included in information handling system 102 may be configured to perform the operations of information handling system 102 with respect to a network boot from a web server.

FIG. 3 illustrates a flow chart of an example method 300 for securely performing a network boot of an information handling system 102 from a remote target 130. Additionally, method 300 may be implemented to reduce the amount of time required to execute a network boot. In the present example, method 300 may be implemented to perform a network boot between a web client included in information handling system 102 and a web server included in target 130. However, method 300 may be utilized to perform any suitable network boot, using any suitable components.

According to one embodiment, method 300 may begin at step 302. As noted above, teachings of the present disclosure may be implemented in a variety of configurations of system 100. As such, the preferred initialization point for method 300 and the order of the steps 302-322 comprising method 300 may depend on the implementation chosen.

At step 302, information handling system 102 may perform an HTTP secure (HTTPS)—or other suitable security protocol—request to retrieve an operating system from target 130 to boot. At step 304, instead of the request going to target 130, access controller 112 may be configured as a proxy to receive the request.

At step 306, access controller 112 may create a secure, mutually authenticated HTTPS connection between access controller 112 and target 130 on behalf of information handling system 102. Access controller 112 may store the authentication information on storage media 116 or any other suitable storage device. The increased storage capabilities of access controller 112 may allow access controller 112 to store more data and instructions than information handling system 102 due to information handling system 102 being configured to retrieve data and instructions from remote devices (e.g., target 130). Accordingly, access controller 112 may be more easily configured to properly create a secure connection with target 130 than the programs with limited functionality (e.g. boot loaders) stored on information handling system 102 (e.g., stored in memory 104). Additionally, the connection between information handling system 102 and access controller 112 may be inherently secure, thus access controller 112 may securely convey the information and data received from target 130 to information handling system 102.

At step 308, access controller 112 may receive OS metadata, or any other suitable data that may identify data, from target 130. At step 310, access controller 112 may compare the metadata received with metadata associated with OS data stored in a cache included in storage media 116 or any other suitable storage device. Access controller 112 may be configured to maintain the cache such that access controller 112 may provide the OS data to information handling system 102 instead of having to retrieve the OS data from target 130. Thus, by storing the OS data in the cache, information handling system 102 may receive and boot the OS data without having to wait to receive the data from target 130 via network 120, which may speed up the boot process of information handling system 102. Additionally, in instances where a "boot storm" occurs and a large number of information handling systems 102 attempt to boot from target 130 in a relatively short period of time, information handling system 102 may boot from the cached data on access controller 112 instead of target 130. Accordingly, the number of boot requests bombarding target 130 during a "boot storm" may be reduced, allowing target 130 to attend to the information handling systems that do not have access controllers with OS data cached thereon.

At step 312, access controller 112 may determine whether the received metadata is associated with the data stored in the cache, and if the data in the cache is current, and thus may determine if the cache contains the appropriate OS data. If the cache does contain the appropriate OS data, method 300 may proceed to step 320, otherwise method 300 may proceed to step 314.

At step 314, access controller 112 may request the OS data from target 130, and at step 316, access controller 112 may receive the OS data from target 130. At step 318, access controller 112 may store the received OS data in the cache.

At step 320, access controller 112 may send the OS data stored on the cache to information handling system 102, and at step 322 information handling system 102 may utilize a boot loader to boot the OS. Following step 322, method 300 may end. Accordingly, access controller 112 may establish a secure connection between information handling system 102 and target 130, whereas traditional boot loaders in some information handling systems may not have this capability. Additionally, in some instances, access controller 112 may act as a proxy to target 130 to speed up the boot process of information handling system 102 and reduce the negative effects of a "boot storm."

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order. Method 300 may be implemented using system 100 or any other system operable to implement method 300. In certain embodiments, method 300 may be implemented partially or fully in software and/or firmware embodied in computer-readable media.

Using the methods and systems disclosed herein, problems associated with conventional approaches to performing a network boot (e.g., iSCSI boot) may be improved, reduced, or eliminated. For example, the number of boot cycles required to perform the boot may be reduced, and the amount of time required to perform a boot may be reduced; thus, reducing the amount of time that an information handling system may be unavailable. Additionally, by utilizing the secure connection between an access controller and an information handling system, the information handling system may be configured to perform a network boot without the security concerns of some traditional implementations. Further, the processing capabilities of an access controller may be utilized to establish a secure connection between an information handling system and a target in preparation for a network boot.

Although the present disclosure has been described in detail, it should be understood that various changes, substitutions, and alterations can be made hereto without departing from the spirit and the scope of the disclosure as defined by the appended claims.

What is claimed is:

1. An information handling system comprising:
a processor;
a memory communicatively coupled to the processor; and
an access controller integrated in the information handling system and communicatively coupled to the processor, the access controller having stored thereon a general pre-boot execution environment (gPXE) binary file, the access controller configured to:
receive boot configuration information from a management server;
generate a gPXE boot script according to the boot configuration information;
generate a specific gPXE binary file based on the general gPXE binary file and the gPXE boot script; and
configure the information handling system to boot to a target based on the specific gPXE binary file.

2. An information handling system according to claim 1, the access controller further configured to initiate a secure connection between the access controller and the target.

3. An information handling system according to claim 1, the access controller further configured to store operating system (OS) data in a cache and send the OS data to the information handling system.

4. An information handling system according to claim 3, the access controller further configured to determine if OS data associated with the target is stored in the cache, and if the OS data associated with the target is not stored in the cache, retrieve the OS data from the target and store the OS data associated with the target in the cache.

5. An information handling system according to claim 1, the boot configuration information including at least one of a host internet small computer system interface (iSCSI) qualified name (iQN) and a target iQN.

6. An information handling system according to claim 1, the access controller further configured to configure the information handling system to perform an internet small computer system interface (iSCSI) boot with respect to the target.

7. An access controller, comprising:
a non-transitory computer-readable medium; and
computer-executable instructions carried on the non-transitory computer-readable medium, the instructions readable by the access controller integrated in an information handling system, the instructions, when read and executed, for causing the access controller to:
receive boot configuration information from a management server;
generate a network pre-boot execution environment (gPXE) boot script according to the boot configuration information;
generate a specific gPXE binary file based on a general gPXE binary file stored on the access controller and the gPXE boot script; and
configure the information handling system to boot to a target based on the specific gPXE binary file.

8. An access controller according to claim 7, further comprising instructions for causing the access controller to initiate a secure connection between the access controller and the target.

9. An access controller according to claim 7, further comprising instructions for causing the access controller to store operating system (OS) data in a cache and send the OS data to the information handling system.

10. An access controller according to claim 9, further comprising instructions for causing the access controller to determine if OS data associated with the target is stored in the cache, and if the OS data associated with the target is not stored in the cache, retrieve the OS data from the target and store the OS data associated with the target in the cache.

11. An access controller according to claim 7, the boot configuration information including at least one of a host internet small computer system interface (iSCSI) qualified name (iQN) and a target iQN.

12. An access controller according to claim 7, further comprising instructions for causing the access controller to configure the information handling system to perform an internet small computer system interface (iSCSI) boot with respect to the target.

13. A method comprising:
receiving, by an access controller integrated in an information handling system, boot configuration information from a management server;
generating, by the access controller, a network pre-boot execution environment (gPXE) boot script according to the boot configuration information;
generating, by the access controller, a specific gPXE binary file based on a general gPXE binary file stored on the access controller and the gPXE boot script; and
configuring, by the access controller, the information handling system to boot to a target based on the specific gPXE binary file.

14. A method according to claim 13, further comprising initiating, by the access controller, a secure connection between the access controller and the target.

15. A method according to claim 13, further comprising storing, by the access controller, operating system (OS) data in a cache and sending the OS data to the information handling system.

16. A method according to claim 15, further comprising determining, by the access controller, if OS data associated with the target is stored in the cache, and if the OS data associated with the target is not stored in the cache, retrieving the OS data from the target and storing the OS data associated with the target in the cache.

17. A method according to claim 13, the boot configuration information including at least one of a host internet small computer system interface (iSCSI) qualified name (iQN) and a target iQN.

18. A method according to claim 13, further comprising configuring, by the access controller, the information handling system to perform an internet small computer system interface (iSCSI) boot with respect to the target.

* * * * *